(12) United States Patent
Monden

(10) Patent No.: US 10,776,063 B2
(45) Date of Patent: Sep. 15, 2020

(54) INFORMATION PROCESSING APPARATUS AND METHOD OF CONTROLLING THE SAME

(71) Applicant: CANON KABUSHIKI KAISHA, Tokyo (JP)

(72) Inventor: Kazuhiro Monden, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/295,303

(22) Filed: Mar. 7, 2019

(65) Prior Publication Data

US 2019/0278549 A1    Sep. 12, 2019

(30) Foreign Application Priority Data

Mar. 8, 2018   (JP) ................................ 2018-042302

(51) Int. Cl.
*G06F 3/14* (2006.01)
*G09G 5/00* (2006.01)

(52) U.S. Cl.
CPC ........... *G06F 3/1423* (2013.01); *G09G 5/006* (2013.01); *G09G 2354/00* (2013.01)

(58) Field of Classification Search
CPC .... G06F 3/1423; G06F 3/1431; G06F 3/1438; G06F 3/1446; G06F 3/1454; G06F 3/1462; G09G 5/006; G09G 2354/00; H04N 21/4122; H04N 21/4126
See application file for complete search history.

(56) References Cited

U.S. PATENT DOCUMENTS

| | | | | |
|---|---|---|---|---|
| 9,524,140 B2* | 12/2016 | Leibow | ................. | G06F 3/1454 |
| 9,575,582 B2* | 2/2017 | Kim | ........................ | G06F 3/041 |
| 9,792,007 B2* | 10/2017 | Sirpal | ................... | G06F 1/1694 |
| 9,959,018 B2* | 5/2018 | Ryu | ....................... | G06F 3/0484 |
| 9,992,529 B2* | 6/2018 | Bogers | ............... | H04N 21/4126 |
| 10,152,294 B2* | 12/2018 | Jan | ......................... | G06F 3/1454 |
| 10,175,847 B2* | 1/2019 | Jeon | ....................... | H04N 7/183 |
| 10,375,342 B2* | 8/2019 | Alsina | .................. | H04N 5/4403 |
| 10,387,098 B2* | 8/2019 | Park | ..................... | H04M 1/7253 |
| 2010/0079672 A1* | 4/2010 | Bae | ........................ | G06F 3/0483 |
| | | | | 348/565 |

(Continued)

FOREIGN PATENT DOCUMENTS

| | | |
|---|---|---|
| JP | 2010-033375 A | 2/2010 |
| JP | 2014-127915 A | 7/2014 |

*Primary Examiner* — Tom V Sheng
(74) *Attorney, Agent, or Firm* — Cowan, Liebowitz & Latman, P.C.

(57) ABSTRACT

An information processing apparatus which displays an image on a display, comprises a communication interface configured to communicate with a display apparatus, and a controller configured to transmit an extended display image to be displayed on the display apparatus to the display apparatus via the communication interface, the extended display image being different from the image displayed on the display. While a user interface capable of accepting operations related to the extended display image is displayed together with the extended display image on the display apparatus, the controller causes the user interface to be displayed on the display if an instruction to stop transmission of the extended display image is input via the user interface.

9 Claims, 9 Drawing Sheets

(56) References Cited

U.S. PATENT DOCUMENTS

| | | | | |
|---|---|---|---|---|
| 2010/0175085 A1* | 7/2010 | Seol | ............ | H04N 7/165 |
| | | | | 725/39 |
| 2014/0189589 A1* | 7/2014 | Kim | ............ | G06F 3/1462 |
| | | | | 715/810 |
| 2014/0351844 A1* | 11/2014 | Minemura | ............ | H04N 21/472 |
| | | | | 725/25 |
| 2015/0215672 A1* | 7/2015 | Park | ............ | H04N 21/4223 |
| | | | | 725/10 |
| 2016/0283781 A1* | 9/2016 | Kurakane | ............ | H04N 7/18 |
| 2019/0286292 A1* | 9/2019 | Tsubone | ............ | G06F 3/0484 |

\* cited by examiner

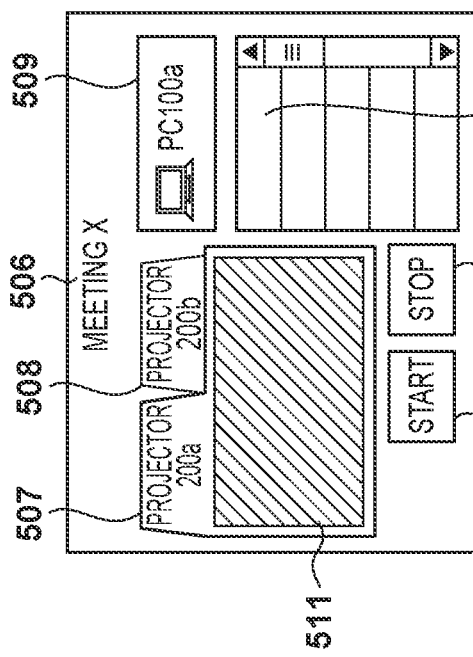
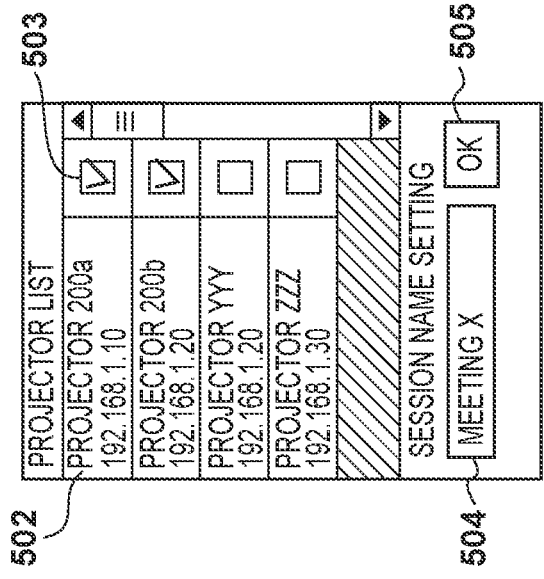
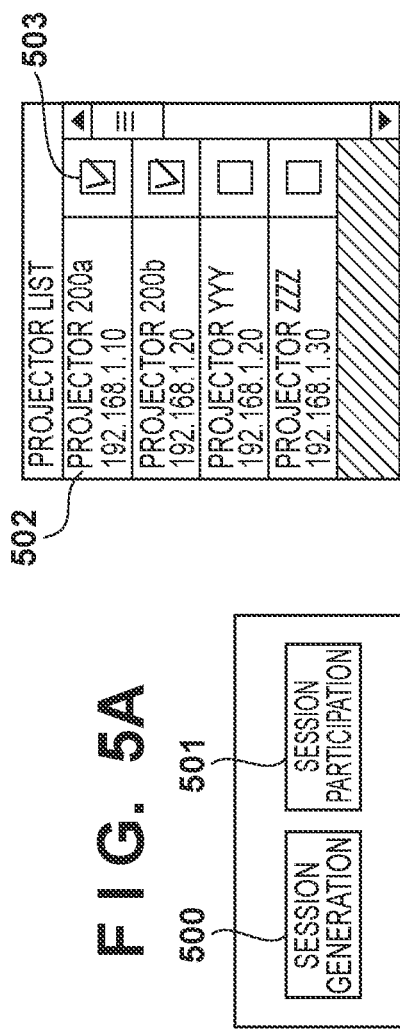
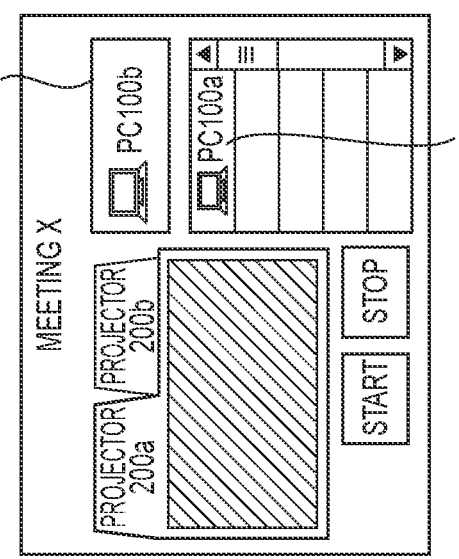
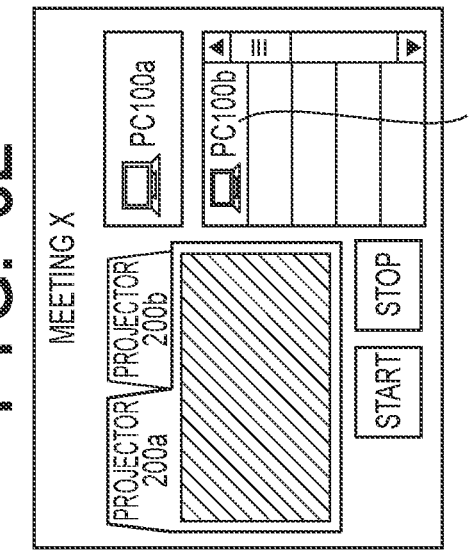
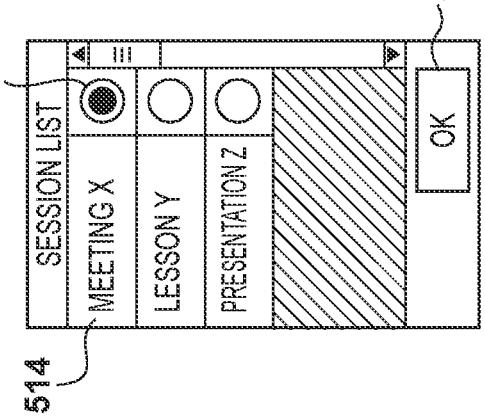

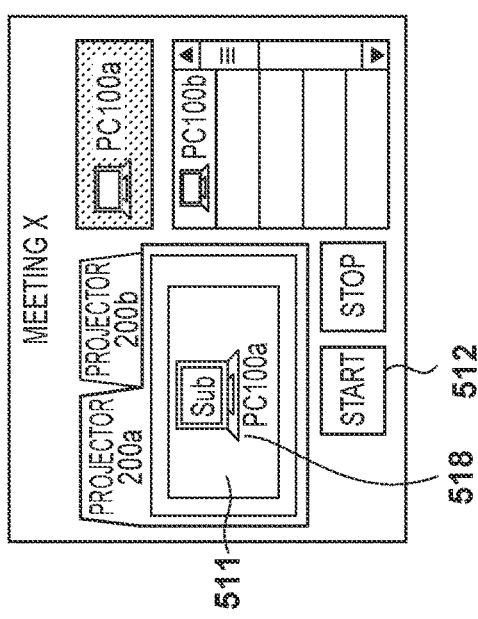
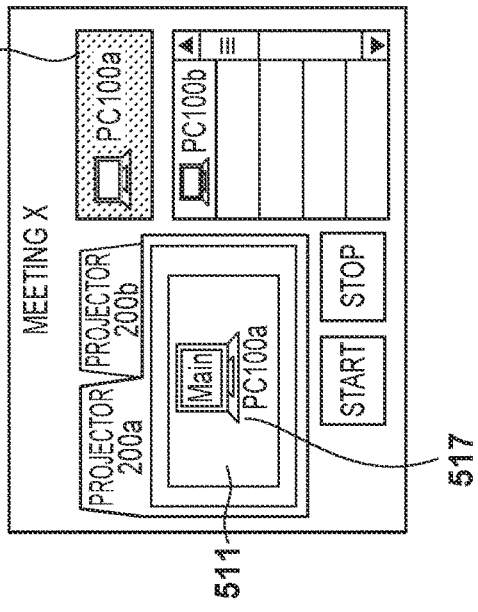
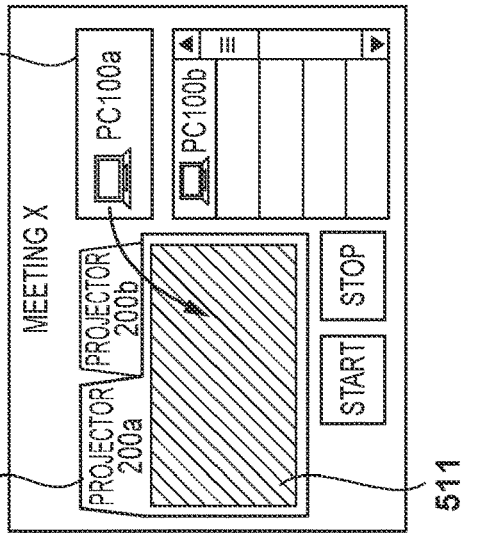
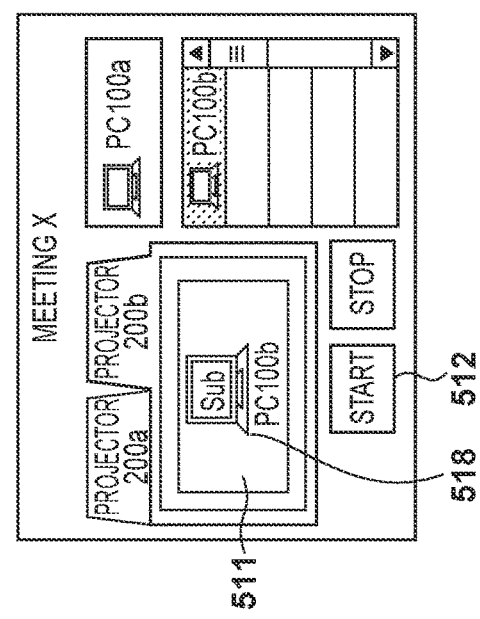
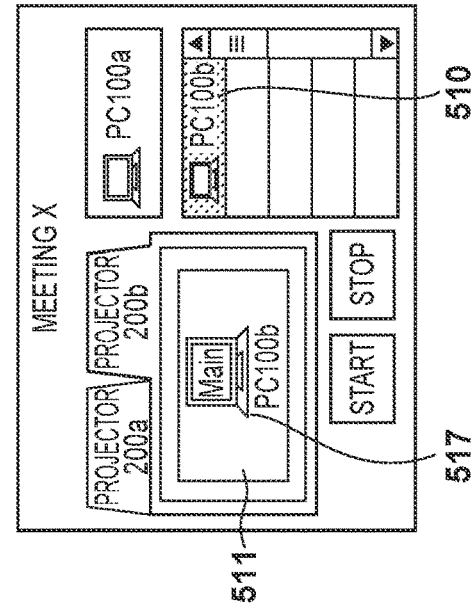
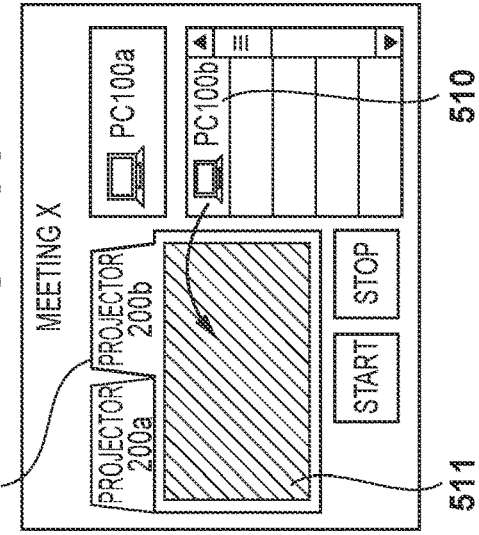

INFORMATION PROCESSING APPARATUS AND METHOD OF CONTROLLING THE SAME

BACKGROUND OF THE INVENTION

Field of the Invention

The present invention relates to an information processing apparatus which connects with an image display apparatus, a control method thereof.

Description of the Related Art

An image transfer system is known in which information processing apparatuses such as personal computers ("PCs" hereinafter) and image display apparatuses such as projectors are connected via a network as opposed to a system in which PCs and projectors are connected via connection cables such as HDMI® cables. Such image transfer systems are provided with functions such as the function of simultaneously causing a plurality of projectors to project an image from a single PC and the function of causing a single projector to project images from a plurality of PCs on multiple screens.

Also, in a conventional system in which connection is made via video cables, when a PC and a projector are connected, the PC can automatically recognize the projector as an external display, and the desktop of the PC can be extended or replicated. In particular, when the desktop is extended, it is possible to treat the area recognized as an external display and spanning the display of the PC and the projector as a desktop area to work in. In this way, the display screen of the PC used by the presenter (the main display) may be different from the projection image, which is projected by the projector, that the audience is viewing (the extended display), as is widely practiced in presentations.

Japanese Patent Laid-Open No. 2014-127915 discloses a technology in which a network group is constructed from a plurality of PCs and a plurality of projectors, and the projectors display images from the PCs in free layouts. It should be noted that an application program of a GUI (Graphic User Interface) that performs image transfer (referred to as the image transfer program hereinafter) runs on each PC, and the user can perform layout processing and can start and stop image transfer with respect to each projector via the GUI.

Here, a case is considered in which, while image transfer is being executed by a PC, the user issues an instruction via the GUI of the image transfer program to stop the image transfer while the GUI is displayed on the extended display and not on the main display. In this case, the projection plane of the projector changes to a no-signal screen, and the user can no longer view the GUI and issue an instruction to start image transfer or position the GUI on the main display. Although a user skilled in operating PCs may be able to reposition the GUI from the extended display to the main display using shortcut keys, etc., not every user is so skilled.

SUMMARY OF THE INVENTION

The present invention has been made in consideration of the aforementioned problems, and realizes a system capable of avoiding a situation in which, if an instruction to stop image transfer is issued, operations related to image transfer cannot be performed due to the fact that the GUI is no longer visible.

In order to solve the aforementioned problems, the present invention provides an information processing apparatus which displays an image on a display, comprising: a communication interface configured to communicate with a display apparatus; and a controller configured to transmit an extended display image to be displayed on the display apparatus to the display apparatus via the communication interface, the extended display image being different from the image displayed on the display, wherein, while a user interface capable of accepting operations related to the extended display image is displayed together with the extended display image on the display apparatus, the controller causes the user interface to be displayed on the display if an instruction to stop transmission of the extended display image is input via the user interface.

In order to solve the aforementioned problems, the present invention provides an information processing apparatus which displays an image on a display, comprising: a communication interface configured to communicate with a display apparatus; and a controller configured to transmit an extended display image to be displayed on the display apparatus to the display apparatus via the communication interface, the extended display image being different from the image displayed on the display, wherein the controller displays a user interface at least on the display, the user interface being capable of accepting operations related to the extended display image.

In order to solve the aforementioned problems, the present invention provides a method of controlling an information processing apparatus that includes a communication interface configured to communicate with a display apparatus via a network and displays an image on a display, the method comprising: transmitting an extended display image to be displayed on the display apparatus to the display apparatus via the communication interface, the extended display image being different from the image displayed on the display; and causing, while a user interface capable of accepting operations related to the extended display image is displayed together with the extended display image on the display apparatus, the user interface to be displayed on the display if an instruction to stop transmission of the extended display image is input via the user interface.

In order to solve the aforementioned problems, the present invention provides a method of controlling an information processing apparatus that includes a communication interface configured to communicate with a display apparatus via a network and displays an image on a display, the method comprising: transmitting an extended display image to be displayed on the display apparatus to the display apparatus via the communication interface, the extended display image being different from the image displayed on the display; and displaying a user interface at least on the display, the user interface being capable of accepting operations related to the extended display image.

In order to solve the aforementioned problems, the present invention provides a non-transitory computer-readable storage medium storing a program for causing a computer to execute a method of controlling an information processing apparatus that includes a communication interface configured to communicate with a display apparatus via a network and displays an image on a display, the method comprising: transmitting an extended display image to be displayed on the display apparatus to the display apparatus via the communication interface, the extended display image being different from the image displayed on the display; and causing, while a user interface capable of accepting operations related to the extended display image is displayed together with the extended display image on the display apparatus, the user interface to be displayed on the display if an instruction to stop transmission of the extended display image is input via the user interface.

In order to solve the aforementioned problems, the present invention provides a non-transitory computer-readable storage medium storing a program for causing a computer to execute a method of controlling an information processing apparatus that includes a communication interface configured to communicate with a display apparatus via a network and displays an image on a display, the method comprising: transmitting an extended display image to be displayed on the display apparatus to the display apparatus via the communication interface, the extended display image being different from the image displayed on the display; and displaying a user interface at least on the display, the user interface being capable of accepting operations related to the extended display image.

According to the present invention, it is possible to avoid a situation in which, if an instruction to stop image transfer is issued, operations related to image transfer cannot be performed due to the fact that the GUI is no longer visible.

Further features of the present invention will become apparent from the following description of exemplary embodiments (with reference to the attached drawings).

BRIEF DESCRIPTION OF THE DRAWINGS

FIGS. 5A-5L are diagrams illustrating UI screens of a PC according to the present embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An image transfer system according to a first embodiment will be described hereinafter with reference to FIGS. 1 and 2.

In the present embodiment, while a case in which a PC is used as an exemplary information processing apparatus and a projector is used as an exemplary image display apparatus, the present invention is not limited to this. For example, a mobile phone, a digital camera, or a so-called tablet terminal may be used as the information processing apparatus of the present invention. Furthermore, a display, a digital TV set, or a so-called tablet terminal may be used as the image display apparatus of the present invention. Also, for example, any other type of display apparatus that can display images (video images) transferred from a PC may be used as the display apparatus.

Figure 1:
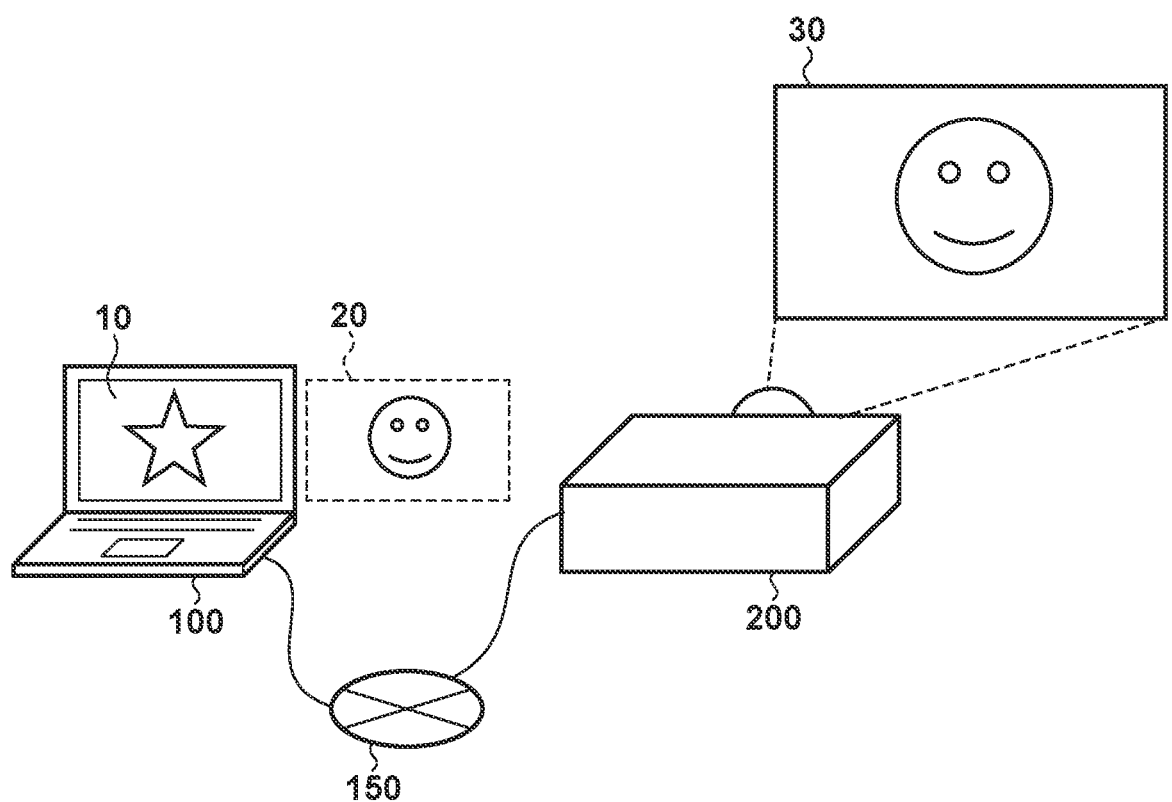
FIG. 1 is a diagram showing a system configuration according to a present embodiment.

In FIG. 1, a PC 100 and a projector 200 of the present embodiment are connected via a communication network 150 such as a LAN (Local Area Network). Upon establishing communication between the PC 100 and the projector 200, the PC 100 generates, in addition to an image 10 on the main display, an image 20 of an extended display and transfers the video image as an image 30 that is compatible with the resolution of the projector 200. The projector 200 projects the image 30 of the extended display transferred from the PC 100 onto a screen, etc. In this way, the user operating the PC 100 (the presenter) can display, using the projector 200, the presentation image 30 intended for an audience while, displaying on the PC 100, the image 10 which could be supplemental materials for the presenter, that is different from the image 30.

As used in the present embodiment, the term "extended display" refers to an area outside of the range of the main display of the PC 100 that is created when the desktop UI displayed on the main display of the PC 100 is extended exceeding the main display resolution of the PC 100. Referring to FIG. 1 as an example, the main display of the PC 100 displays the image as indicated by the reference numeral 10, and the desktop area, while not being shown on the main display, is connected to the right side of the main display as indicated by the reference numeral 20. This area 20 is referred to as the extended display (virtual display).

Figure 2:
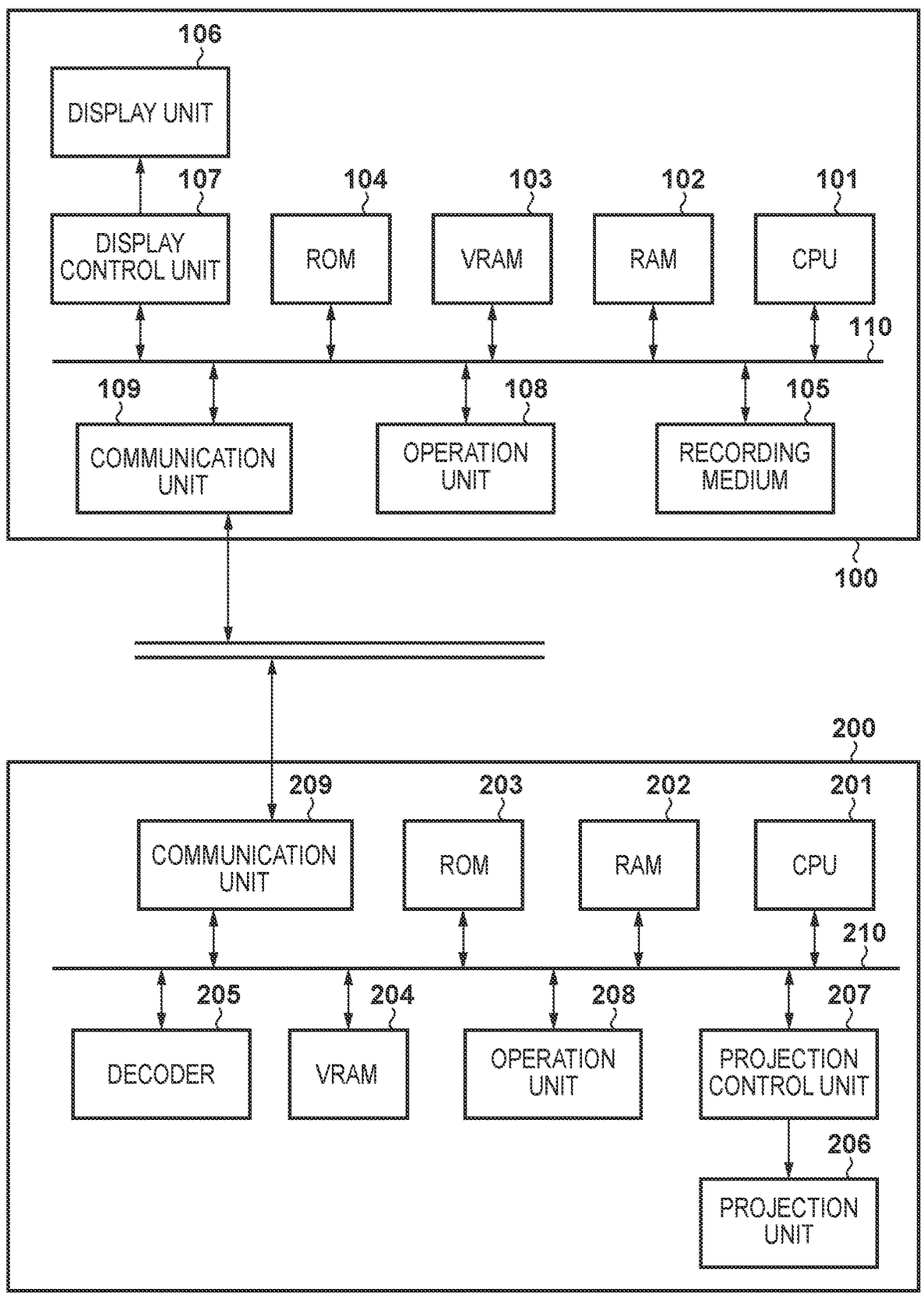
FIG. 2 is a block diagram showing an apparatus configuration according to the present embodiment.

Referring now to FIG. 2, the configurations of the PC 100 and the projector 200, which constitute the image transfer system of the present embodiment, will be described hereinafter.

First, the configuration and function of the PC 100 will be described hereinafter.

The CPU 101 performs overall control of the PC 100, such as display control, recording control, image processing control, communication control, by controlling its components according to input signals and programs. A RAM 102 is the main memory for storing data. The RAM 102 is mainly used as an area for storing various types of data, such as an area for storing or deploying programs executed by the CPU 101 or a work memory for programs being executed. A VRAM 103 stores image data displayed on a display unit (display) 106. If the RAM 102 is sufficiently fast, the RAM 102 may be used as the VRAM 103. A ROM 104 stores the boot program that is executed when the CPU 101 is initialized. The boot program deploys and starts, on the RAM 102, the OS (Operating System) stored in the recording medium 105. The recording medium 105 is a memory card or a hard disk drive for storing data and various programs, such as the image transfer program described below and the OS.

The display unit 106 displays the image data specified by a display control unit (display controller) 107. The display unit 106, for example, is a liquid crystal panel or an organic EL panel. The display control unit 107 reads out the image data stored in the VRAM 103 and displays it on the display unit 106. An operation unit 108 comprises operation members, such as a keyboard, a mouse, and a touch panel, to accept input made by a user and transmit the input to the CPU 101. If a touch panel is used, the touch panel is provided integrated with the display unit 106 so that operations can be input by touching the display surface. A communication unit 109 communicates with external apparatuses, such as the projector 200, via the communication network 150. The communication unit (communication interface) 109 is a communication interface module, such as a Gigabit Ethernet® or wireless LAN module. The communication unit 109 is, however, not limited to these, and various communication systems can also be used. An internal bus 110 connects the above-described components. The PC 100 may not necessarily be controlled by a single piece of hardware. For example, a plurality of pieces of hardware may share the load of processing to implement the various functions of the PC 100.

The following describes basic operations of the PC 100 of the present embodiment.

An application program for transferring images (to be referred to as the image transfer program hereinafter) is installed in the PC 100. The image transfer program executed by the CPU 101 controls the display control unit 107 and captures the image data displayed on the display unit 106 from the VRAM 103, and encodes it in a predetermined format (for example, JPEG) that the projector 200 is capable of projecting. The image transfer program executed by the CPU 101 transmits the encoded image data to the projector 200 via the communication unit 109. The image transfer program executed by the CPU 101 accepts various types of operations such as selection of the projector to be connected to and starting/stopping of image data transfer, via the GUI provided by the image transfer program. The image transfer program converts such operations into control commands and transmits the commands to the projector 200 via the communication unit 109.

Next, the configuration and functions of the projector 200 will be described hereinafter.

The functions of a CPU 201, a RAM 202, a ROM 203, a VRAM 204, an operation unit 208, a communication unit 209, and an internal bus 210 as hardware are the same as those in the PC 100, description of these components is omitted.

The ROM 203 stores the programs and parameters required for the projector 200 to operate, and the CPU 201 operates according to the programs stored in the ROM 203. The VRAM 204 stores the image data projected by the projection unit 206. The decoder 205 decodes the encoded image data transferred from the PC 100. The projection unit 206 has a liquid crystal panel, a lens, a light source, etc., to project the decoded image. The projection control unit (projection controller) 207 reads out the image data held in the VRAM 204 and causes the projection unit 206 to project the data. Alternatively, the CPU 201 may operate as the projection control unit 207. The projector 200 may not necessarily be controlled only by the above-described hardware. For example, a plurality of pieces of hardware may share the load of processing to implement the various functions of the PC 100.

The operation unit 208 comprises buttons provided on the main body of the apparatus and a remote controller reception unit for accepting user operations from a remote controller (not shown) and transmitting them to the CPU 201.

The following describes basic operations of the projector 200 of the image transfer system of the present embodiment.

The CPU 201 of the projector 200 receives, via the communication unit 209, the encoded image data transferred from the PC 100, decodes the data using the decoder 205, and deploys the decoded data on the VRAM 204. The CPU 201 also controls the projection control unit 207, reads out the image data deployed on the VRAM 204, and projects the data using the projection unit 206. Additionally, if the projector 200 is selected as the projector to be connected to in the PC 100, the CPU 201 receives control commands from the PC 100 via the communication unit 209, such as a connection request and starting/stopping of image data transfer, and executes processing according to the commands received.

Description of System Operation

Next, the operations of a system according to the present embodiment will be described with reference to FIGS. 3, 4, 5A to 5L and 6A to 6C.

Figure 3:
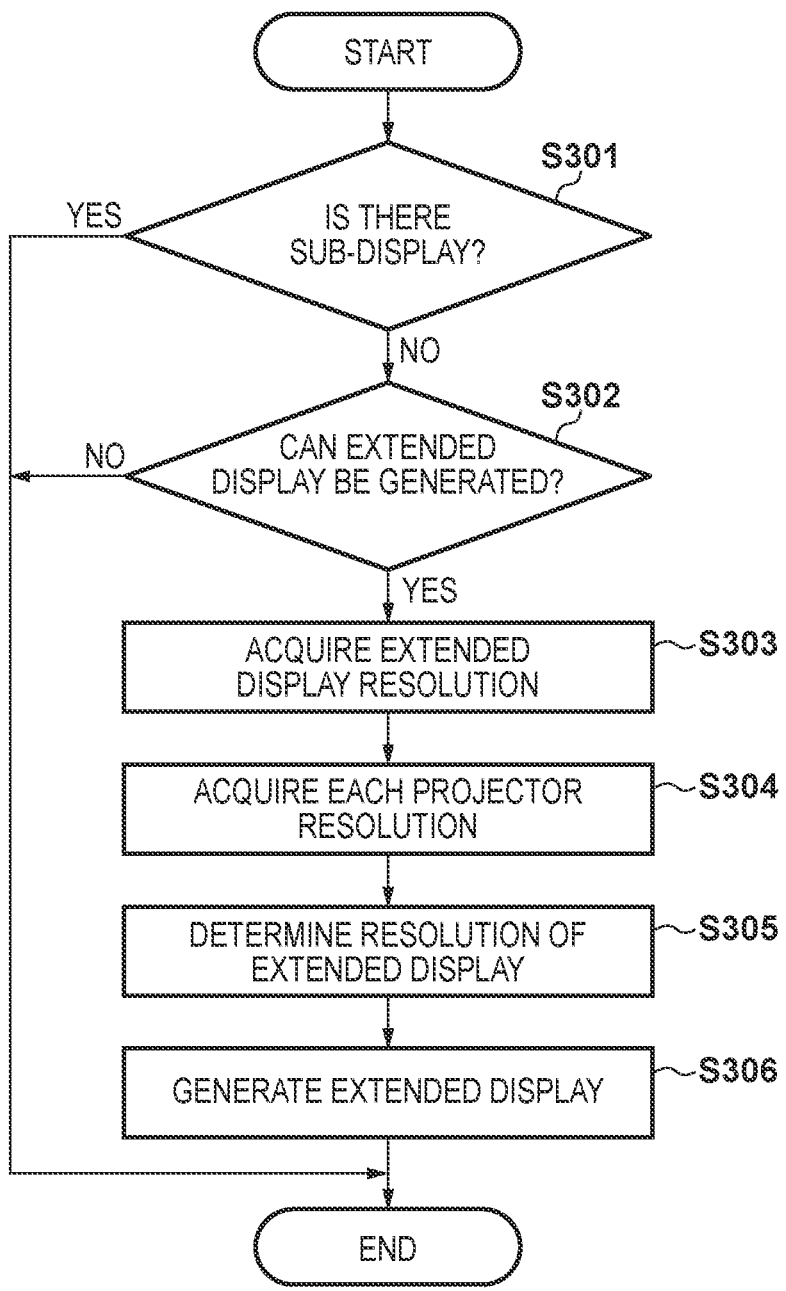
FIG. 3 is a flowchart showing processing for generating an extended display according to the present embodiment.
Figure 4:
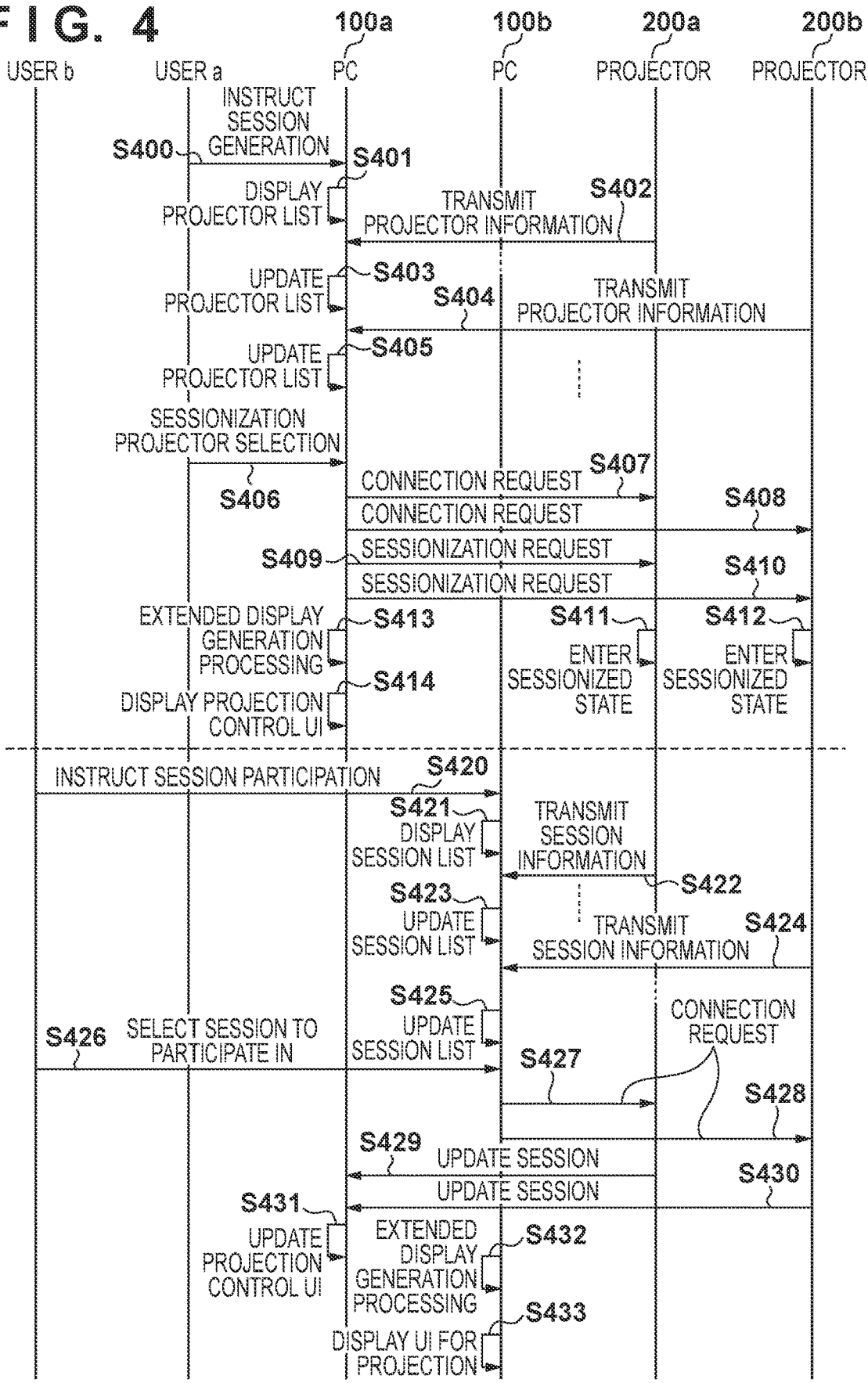
FIG. 4 is a sequence diagram of the processing for generating an extended display according to the present embodiment.
Figure 6A:
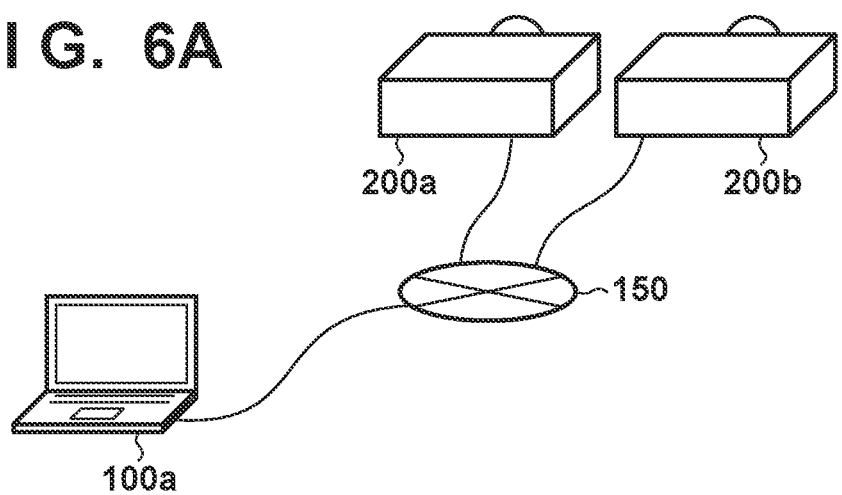
FIGS. 6A-6C are diagrams showing alternative system configurations according to the present embodiment.

FIG. 3 shows a procedure followed by the PC 100 to generate an extended display. FIG. 4 is a sequence diagram showing the processing performed by the user, the PC, and the projector. FIGS. 5A to 5L show exemplary UI screens of the image transfer program of the PC. FIGS. 6A and 6C show alternative system configurations.

Figure 6B:
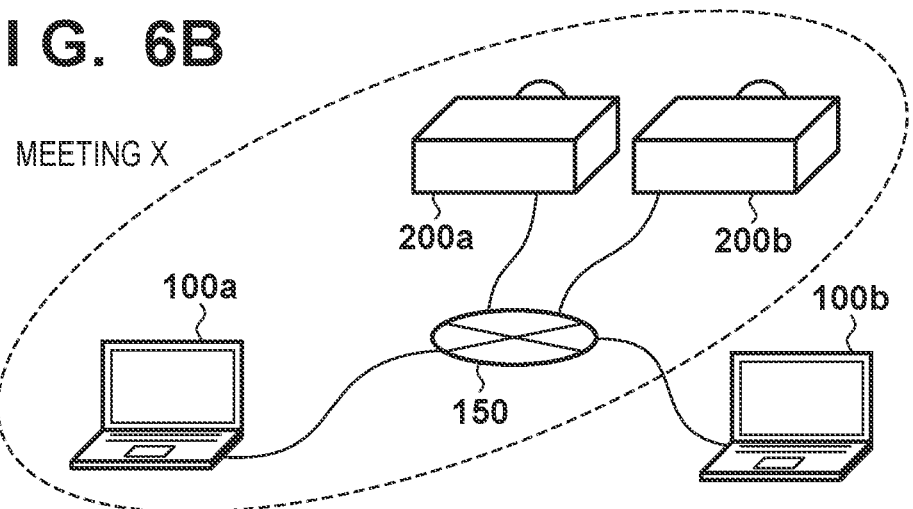
Figure 6C:
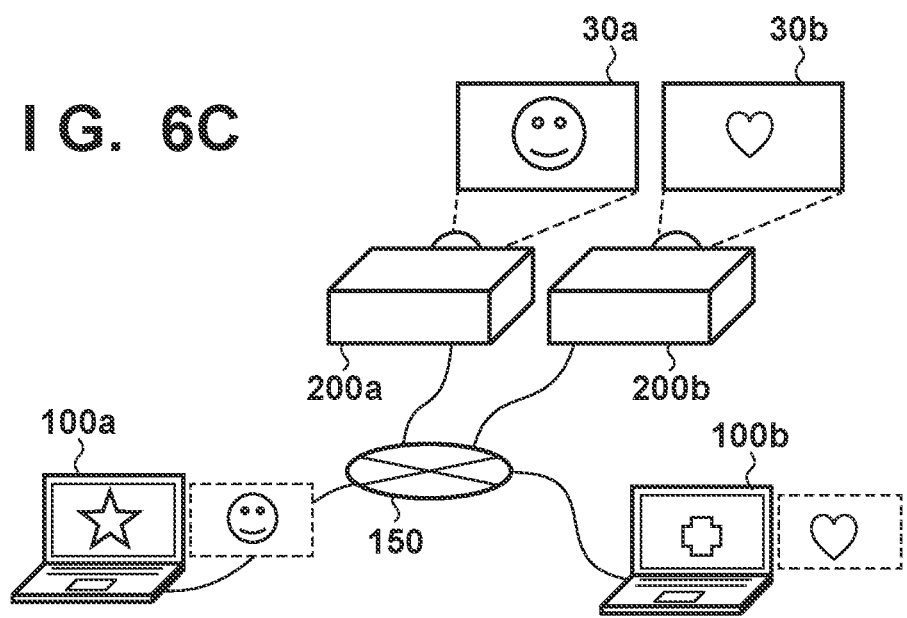

The following describes the processing to generate an extended display in the cases shown in FIGS. 6A and 6B. FIG. 6A shows a case in which the image transfer program of the PC 100a generates a group consisting of projectors 200a and 200b (referred to as a session hereinafter). FIG. 6B shows a case in which a new PC 100b participates in an already generated session (a Meeting X). Although not described in detail, a logical connection has been established between all of the PCs and all of the projectors involved in a session. This makes it possible to start and stop the transfer of image data via the network to each of the projectors selected via the image transfer program of the PC 100a. This also makes it possible to simultaneously transmit the screens of the PCs to all the projectors generating a session. It is also possible for one PC to instruct another PC to start and stop the transfer of image data.

Description of Session Generation Sequence

First, the sequence in which the image transfer program of the PC 100a is operated to generate a session formed by the projectors 200a and 200b will be described with reference to FIGS. 4 and 5A to 5L. The following description refers to a user operating the PC 100a as a user A.

When the user A activates the image transfer program of the PC 100a, the UI shown in FIG. 5A is displayed to prompt the user to select whether to generate a session or participate in a session that has already been generated.

In step S400, the user A instructs the image transfer program of the PC 100a to generate a new session. In other words, the user A presses a button 500 shown in FIG. 5A.

In step S401, the image transfer program of the PC 100a displays the list of projectors shown in FIG. 5B for selecting projectors to generate a session with. The projector list includes a projector information command to be broadcast by the projectors via the network.

In the present embodiment, the projectors 200a and 200b are on the network, and thus the projectors 200a and 200b broadcast a projector information command over the network in steps S402 and S404. A projector information command includes the IP address of the projector and the projector name, for example. In this example, to simplify the description, a projector information command is transmitted when an instruction to generate a session is made. However, before being sessionized, each projector transmits a projector information command at regular intervals.

In steps S403 and S405, the image transfer program of the PC 100a updates the projector list because projector information commands have been received. In particular, as shown in FIG. 5B, information regarding the projectors 200a and 200b is displayed in a projector list display area 502 as projectors that can be selected when generating a session. The UI shown in FIG. 5B displays a list of pieces of information regarding the projectors that can be selected for sessionization and includes check boxes 503 for selecting the projectors.

In step S406, the user A selects the projectors 200a and 200b from the projector list of the image transfer program of the PC 100a to issue an instruction to generate a session. This operation corresponds to the selection of the projectors 200a and 200b made by checking the appropriate check boxes 503 shown in FIG. 5B. This also corresponds to entering the name of the session to a session name entry area 504 ("Meeting X" in this example) and pressing a confirmation button 505.

In steps S407 and S408, the image transfer program of the PC 100a establishes a logical connection with the projectors 200a and 200b, which are to be sessionized, and the PC 100a. Upon establishing a connection, the PC 100a transmits its own IP address and name ("PC 100a" in this example) to the projectors 200a and 200b. As described above, data transfer is enabled between the PC that has established a connection and the sessionized projectors. Although a detailed description is omitted, password verification may additionally be required for each projector before establishing a connection.

In steps S409 and S410, the image transfer program of the PC 100a transmits a sessionization request command to each of the projectors 200a and 200b, with which a connection has been established. A sessionization request command includes at least the number of projectors selected from the projector list display area 502 of FIG. 5B with which a session is generated and information regarding each projector (the IP address and the projector name). Furthermore, the sessionization request command includes the session name entered in the session name entry area 504 shown in FIG. 5B.

In steps S411 and S412, upon receiving a sessionization request command, the projectors 200a and 200b enter a sessionized state. In these steps, the CPU 201 of each of the projectors 200a and 200b stores, in the RAM 202, information regarding each projector (the IP address and the projector name), the name of the session, and information regarding the PC participating in the session (the IP address and the PC name).

In step S413, the image transfer program of the PC 100a performs the processing to generate an extended display, which will be described below.

Extended Display Generation Processing

Referring now to FIG. 3, the processing performed in step S413 of FIG. 4 to generate an extended display will be described hereinafter. The processing shown in FIG. 3 is implemented by the CPU 101 of the PC 100 executing the image transfer program.

In step S301, the CPU 101 uses the display control unit 107 to determine whether or not a sub-display exists in addition to the main display. If a sub-display exists, the processing is terminated, and if there is no sub-display, the process proceeds to step S302. If a sub-display exists in the setup, it is possible, for example, to display presentation materials to the audience on the main display while displaying auxiliary materials to the presenter on the sub-display. In other words, without applying the present embodiment, the user can cause the projector to project the presentation materials and cause the display at hand to display the auxiliary materials simply by specifying that the main display is to be transferred to the projector.

In step S302, the CPU 101 determines, via the display control unit 107, whether or not it is possible to generate an extended display. If it is possible to generate an extended display, the process proceeds to step S303, otherwise the process is terminated. In this example, the display control unit 107 is already controlling the display operation of the display unit 106. In this processing, in addition to causing the display unit 106 (the main display) to display information, the image transfer program also makes an inquiry to the display driver as to whether or not it is possible to generate an extended display via the API (Application Programming Interface) provided by the OS.

In step S303, the CPU 101 acquires the resolution corresponding to the extended display from the display control unit 107 and stores it in the RAM 102, and the process proceeds to step S304.

In step S304, the CPU 101 controls the communication unit 109 to request each of the projectors with which connection has been established to transmit its resolution, and stores the resolution received from each projector in the RAM 102, and the process proceeds to step S305.

In step S305, the CPU 101 determines the resolution of the extended display based on the resolution corresponding to the extended display stored in the RAM 102 in step S303 and the resolutions of the connected projectors stored in the RAM 102 in step S304, and the process proceeds to step S306. In this case, as the resolution at which the extended display can be generated, the CPU 101 applies, for example, the resolution closest to the lowest resolution of the resolutions of the plurality of connected projectors (including the resolution equivalent to the smallest resolution). In this way, the network bandwidth can be minimized when simultaneously displaying the image of the extended display using all of the plurality of the connected projectors. In addition, as the image received by the projectors need not be reduced, it is possible to reduce character blurring and the like.

Alternatively, as the resolution at which the extended display can be generated, the CPU 101 may apply, for example, the resolution closest to the largest resolution of the resolutions of the plurality of connected projectors (including the resolution equivalent to the largest resolution). As this allows for transfer of an optimum image for the projector that has the highest resolution of the resolutions of the plurality of connected projectors, the optimized projector is capable of projecting the image at high resolution.

In step S306, the CPU 101 instructs the display control unit 107 to generate an extended display at the resolution determined at step S305, and the extended display is generated.

Continued Description of Session Generation Sequence

Returning to FIG. 4, the description of the sequence in which a session is generated is resumed. To simplify the following description, in this example, the PC 100a is determined as being able to generate an extended display in step S302, and an extended display has been already generated.

In step S414, the image transfer program of the PC 100a displays the projection control UI shown in FIG. 5C to control the projection operations of the sessionized projectors.

The projection control UI includes a session name display area 506, sessionized projector selection tabs 507 and 508, an own PC information display area 509 that shows information regarding the PC that is executing this particular image transfer program, and a separate PC information display area 510. In addition, the projection control UI includes a projection layout setting area 511, a projection start button 512, and a projection stop button 513.

In the present embodiment, as the PC 100a has sessionized the projectors 200a and 200b under the session name of "Meeting X," the two sessionized projector selection tabs 507 and 508 are displayed. By selecting the tab 507 or 508, the user can display and control the projection layout setting area 511 of the projector that corresponds to the selected tab. A tab is displayed for each sessionized projector. As this session is named "Meeting X", this session name is displayed in the session name display area 506. The own PC information display area 509 displays information regarding the PC itself that is currently executing the image transfer program (that is, information regarding the PC 100a). The separate PC information display area 510 displays information regarding PCs belonging to a session other than the own PC. However, as this step of the present example comes immediately after the generation of a session, nothing is shown in this area as there are no other participating PCs.

Description of Session Participation Sequence

Next, as shown in FIG. 6B, the sequence in which the image transfer program of the PC 100b participates in the session generated by the PC 100a to which the projectors 200a and 200b belong will be described with reference to FIGS. 4 and 5A to 5L. In the following description, the user who operates the PC 100b is referred to as the user B.

First, when the user B activates the image transfer program of PC 100b, the UI shown in FIG. 5A is displayed to prompt the user to select whether to generate a session or participate in a session that has already been generated.

In step S420, the user B instructs the image transfer program of the PC 100b to participate in a session. In other words, the user A presses a button 501 shown in FIG. 5A.

In step S421, the image transfer program of the PC 100b displays the session list shown in FIG. 5D for selecting the session to participate in. The session list includes a session information command to be broadcasted by the projectors via the network.

In the present embodiment, the projectors 200a and 200b are sessionized on the network in steps S411 and S412. Therefore, in steps S422 and S424, each of the projectors 200a and 200b reads session information from the RAM 202 and broadcasts it over the network as a session information command. A session information command includes the number of projectors generating the session, the IP address of each projector, the name of each projector, the session name, the IP addresses of the PCs, and the names of the PCs. In addition, the aforementioned information is included in the information transmitted to the projectors 200a and 200b upon the PC 100a making a connection request in steps S407 and S408 and in the sessionization request command transmitted by the PC 100a in steps S409 and S410. As the information transmitted by the PC 100a to the projector 200a is the same as the information transmitted by the PC 100a to the projector 200b, the session information commands transmitted by the projectors 200a and 200b are also the same. The projectors to be sessionized are the two projectors 200a and 200b, the session name is "Meeting X", and the PC that is participating in the session is the PC 100a.

The image transfer program of the PC 100b has received session information commands, and thus the program updates the session list in steps S423 and S425. Specifically, the session list display area 514 indicates the session name "Meeting X" as the session to participate in as shown in FIG. 5D. As the session information commands received in steps S423 and S425 are the same, no update is performed in step S425. The session list is provided with a radio button 515 for selecting a session to participate in, allowing the user to select one session to participate in.

In step S426, from the session list of the image transfer program of the PC 100b, the user B selects the session to which the projectors 200a and 200b belong as the session to participate in. This operation corresponds to selecting "Meeting X" using the radio button 515 shown in FIG. 5D and pressing an OK button 516.

In steps S427 and S428, the image transfer program of the PC 100b establishes a logical connection with the projectors 200a and 200b to be sessionized and the PC 100b. The PC 100b transmits its own IP address and name ("PC 100b" in this example) to the projectors 200a and 200b.

In steps S429 and S430, the projectors 200a and 200b connected to the new PC 100b update the PC information regarding the PC that is already participating in the session, the PC information being managed as session information, and also notify the PC that is participating in the session (the PC 100a) of this fact.

In step S431, the image transfer program of the PC that has received the notification made in step S430 (the PC 100a) updates the projection control UI as shown in FIG. 5E based on the received session information. As the session information includes the name of the PC 100b, which has newly participated in the session, the image transfer program of the PC 100b updates the separate PC information display area 510 to show information regarding the PC 100b.

In step S432, the image transfer program of the PC 100b performs the processing to generate an extended display as described in connection with step S413 in FIG. 4.

In step S433, the image transfer program of the PC 100b shows the projection control UI shown in FIG. 5F to control the projection operations of the sessionized projectors. The content in the own PC information display area 509 and the content in the separate PC information display area 510 of the UI shown in FIG. 5F are the reverse of those in the UI of the image transfer program of the PC 100a shown in FIG. 5E.

Projection Control after Sessionization

With reference to FIGS. 5E to 5L, the following describes the procedure in which after sessionization the user transfers, via the projection control UI of the image transfer program of the PC 100a, the image of the extended display of the PC 100a to the projector 200a and the image of the extended display of the PC 100b to the projector 200b as shown in FIG. 6C.

Transfer of Extended Display Generated by PC 100a to Projector 200a

First, the procedure by which the image transfer program of the PC 100a transfers the image of the extended display generated by the PC 100a to the projector 200a will be described hereinafter.

As a result of the processing described so far, the projection control UI of the image transfer program of the PC 100a is as shown in FIG. 5E. In this state, the tab 507 is selected from the sessionized projector tabs, as shown in FIG. 5G, in order to operate the projection layout of the projector 200a. Moreover, in FIG. 5G, when the own PC information display area 509 indicating the PC 100a is dragged and dropped in the projection layout setting area 511, the projection control UI changes to that shown in FIG. 5H. The own PC information display area 509 is grayed out to indicate the own PC is in the projection layout. Furthermore, the projection layout setting area 511 indicates, with the icon 517, that the display to be projected of the PC 100a, or the own PC, is the main display. By clicking on the icon 517, the projection control UI changes to that shown in FIG. 5I.

In this way, the display to be projected can be switched to the sub-display as indicated by the icon 518 as shown in FIG. 5I. In the PC 100*a*, the extended display generated in step S413 of FIG. 4 is the display to be projected. It should be noted that, if it is determined in step S301 of FIG. 3 that a sub-display exists, the sub-display is the display to be projected.

By pressing the projection start button 512 in this state, the image transfer program of the PC 100*a* controls the display control unit 107 to capture the image data that corresponds to the extended display from the VRAM 103 and encode the data. Subsequently, the encoded image is transmitted via the communication unit 109 to the projector 200*a* (selected in step S407 of FIG. 4), which in turn receives, decodes, and projects the image as described above. As a result, as shown in FIG. 6C, the projector 200*a* projects the extended display 30*a* of the PC 100*a*.

Transfer by PC 100*a* of Extended Display Generated by Other PC (PC 100*b*) to Projector 200*b*

The following describes the procedure in which the image transfer program of the PC 100*a* transfers the image of the extended display generated by the PC 100*b* to the projector 200*b*.

The tab 508 shown in FIG. 5J is selected, from among the sessionized projector tabs in the state shown in FIG. 5I, in order to operate the projection layout of the projector 200*b*. At this point, as projection layout has not yet been set for the projector 200*b*, no settings have been made in the projection layout setting area 511 as shown in FIG. 5J. Moreover, in FIG. 5J, when the separate PC information display area 510 showing the PC 100*b* is dragged and dropped in the projection layout setting area 511, the projection control UI changes to that shown in FIG. 5K. The separate PC information display area 510 is grayed out to indicate the PC 100*b*, which is the separate PC, is already in the projection layout. Furthermore, the projection layout setting area 511 indicates, with the icon 517, that the display of the PC 100*b* to be projected is the main display. By clicking on the icon 517, the projection control UI changes to that shown in FIG. 5L.

In this way, the display to be projected can be switched to the sub-display as indicated with the icon 518 shown in FIG. 5L. As an extended display was generated in the PC 100*b* in step S432 of FIG. 4, the extended display is the display to be projected. It should be noted that, if it is determined in step S301 of FIG. 3 that a sub-display exists, the sub-display will be the display to be projected.

By pressing the projection start button 512 in this state, the image transfer program of the PC 100*a* transmits a layout notification of the fact that the extended display of the PC 100*b* is to be projected, to the projector 200*b* via the communication unit 109. Upon receiving this layout notification, the CPU 201 of the projector 200*b* reads out the information regarding the PC 100*b* from the session information managed by the RAM 202 and transmits, to the IP address of the PC 100*b*, a transmission start request to start transmission of the extended display image.

Upon receiving the request to start transmission of the extended display image, the image transfer program of the PC 100*b* controls the display control unit 107 to capture the image data that corresponds to the extended display from the VRAM 103 and encode the data. Subsequently, the encoded image is transmitted via the communication unit 109 to the projector 200*b* (i.e., the source of the request to start transmission of the extended display image), which in turn receives, decodes, and projects the image as described above. As a result, as shown in FIG. 6C, the projector 200*b* projects the extended display 30*b* of the PC 100*b*.

In the foregoing embodiment, to simplify the description, a technique has been described in which the image transfer program of the PC 100*a* is used to control projection. It should be noted, however, that the image transfer program of the PC 100*b* is capable of performing the same control. The same applies if more PCs participate in the session.

Although not shown in FIG. 3, when user operation is made instructing termination of the image transfer program, the CPU 101 may show a UI for selecting whether to leave the session in which the user is participating or to terminate the session in which the user is participating.

If the user issues an instruction to leave the session in which the user is participating, that is, if the connection with the projectors with which this PC is logically connected is interrupted, the display control unit 107 may be controlled to discard the extended display generated in step S306.

If the user issues an instruction to terminate the session in which the user is participating, the connection with the projectors with which this PC is logically connected may also be interrupted and the extended display may be discarded as described above. Moreover, if an instruction to terminate a session is issued, the other PC that is participating in the session also detects the termination of the session. In this case, the logical connection with the projectors may also be interrupted and the extended display may also be discarded.

Also, in addition to the normal processing flow described above, the image transfer program may also interrupt a logical connection with the projectors and discard extended displays if it is detected that it is no longer possible to communicate with any of the projectors forming the session.

To confirm that communication with the projectors is valid, the image transfer program may use, for example, the projector information command transmitted at regular intervals described in connection with steps S402 and S404 of FIG. 4. That is, if it is detected that a projector information command has not been received from any of the projectors forming the session for a predetermined period of time, the image transfer program can determine that communication with that projector has ceased.

As described above, in the image transfer system of the present embodiment, extended displays of PCs can be transferred to projectors after sessionization.

An extended display can be invalidated when a user leaves the session, when a session is terminated, when termination of a session is detected, or upon detecting that the communication path to a projector forming the session has been cut off. Furthermore, as a PC generates an extended display using the display driver that controls the main display, a display different from the main display can be generated and transferred without installing a virtual display driver. A virtual display driver cannot be installed to a PC if the version of Windows® is Windows Vista® or later. If the image transfer program of the present embodiment is used, however, an extended display (a virtual display) can be generated at the PC and transferred to projectors.

Second Embodiment

The following describes a second embodiment.

The following problem may occur when the projection control UI of the image transfer program is positioned on the extended display while an image is being transferred from the PC 100 to the projector 200.

Figure 8A:
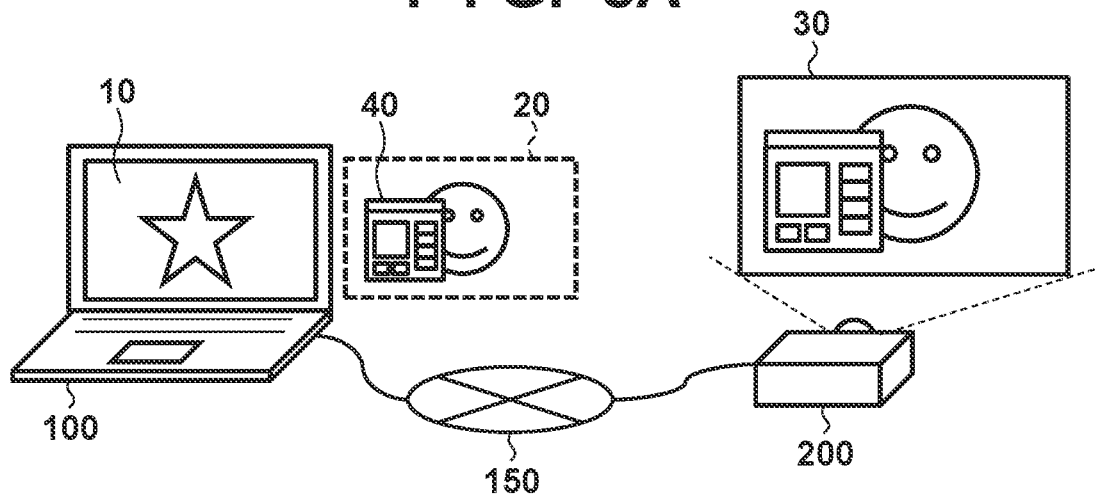
FIGS. 8A to 8C are views describing conventional problems and the processing according to the present embodiment.
Figure 8B:
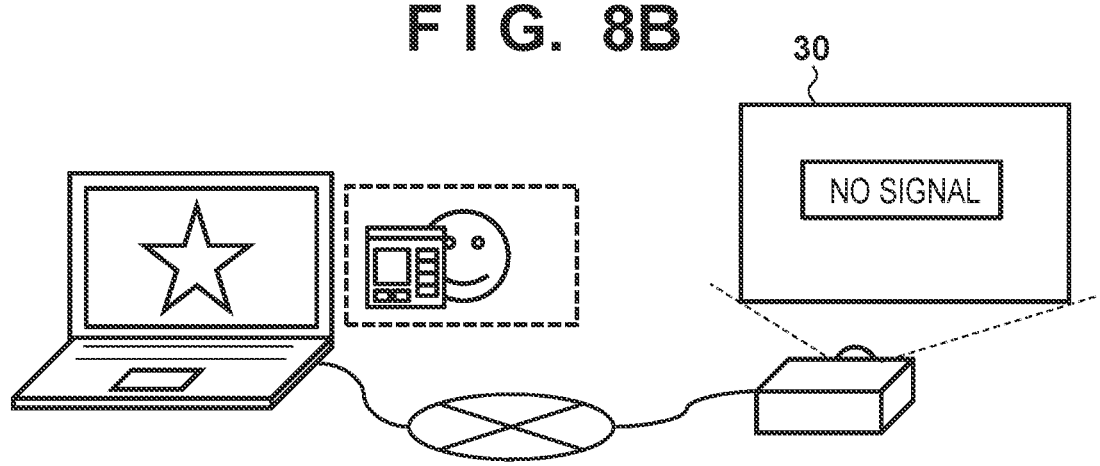

As shown in FIG. 8A, a case is considered in which, upon communication being established between the PC 100 and the projector 200, the PC 100 generates, in addition to an image 10 on the main display, an image 20 for the extended display and transfers the image as an image 30 that is compatible with the resolution of the projector 200. In this way, a user can operate a projection control UI 40 by using an operation member, such as a mouse, while looking at the image (the projection plane) 30 projected by the projector 200 and visually confirming the projection control UI 40. However, if the user issues an instruction to stop the image transfer via the projection control UI 40, the projection plane 30 of the projector 200 changes to a no-signal screen as shown in FIG. 8B, and thus the user can no longer visually recognize the projection control UI 40. As a result, it is no longer possible to issue an instruction to start image transfer or to position the projection control UI 40 on the main display.

In the present embodiment, it is possible to avoid a situation in which the projection control UI 40 cannot be operated if an instruction to stop image transfer is issued while the display position of the projection control UI is on the extended display as described above.

Display Processing of Projection Control UI when Transfer of Extended Display from PC 100a to Projector 200a is Stopped The following describes, with reference to FIGS. 5A to 5L and 7, the processing in which, in the state shown in FIG. 6C, the projector 200a stops projecting the extended display of the PC 100a via the projection control UI of the image transfer program of the PC 100a. The processing shown in FIG. 7 is implemented as a result of the CPU 101 of the PC 100 executing the image transfer program.

As a result of the processing described in the first embodiment being performed, the projection control UI of the image transfer program of the PC 100a is as shown in FIG. 5L. To stop the projector 200a from projecting an image in the state shown in FIG. 5L, first, the tab 507 in FIG. 5L is selected. Then, the projection control UI changes to that shown in FIG. 5I.

Figure 7:
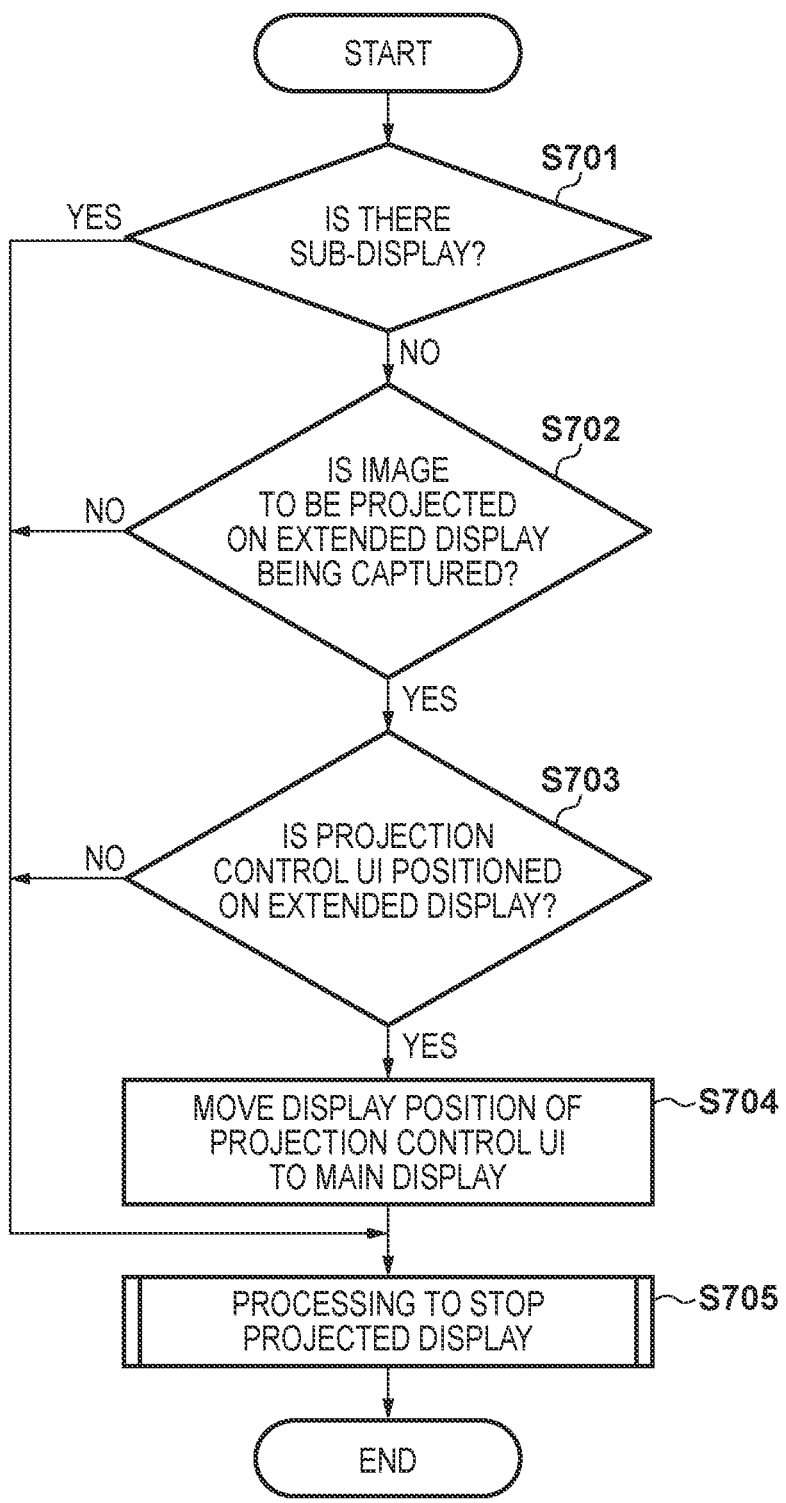
FIG. 7 is a flowchart showing the processing for stopping image transfer according to the present embodiment.

The processing flow in FIG. 7 is started by pressing the projection stop button 513 in the state shown in FIG. 5I.

In step S701, the CPU 101 uses the display control unit 107 to determine whether or not a sub-display exists in addition to the main display. If a sub-display exists, the process proceeds to step S705, and if there is no sub-display, the process proceeds to step S702.

In step S702, the CPU 101 controls the display control unit 107 to determine whether what is being captured from the VRAM 103 to be projected by the projector 200a is an extended display. Then, if data corresponding to the extended display is being captured, the CPU 101 causes the process to proceed to step S703, and if not (i.e., the main display is being captured), the CPU 101 causes the process to proceed to step S705.

In step S703, the CPU 101 controls the display control unit 107 to determine whether or not the projection control UI is positioned on the extended display. Then, if the projection control UI is positioned on the extended display, the CPU 101 causes the process to proceed to step S704, and if not (i.e., if the projection control UI is positioned on the main display), the CPU 101 causes the process to proceed to step S705.

Figure 8C:
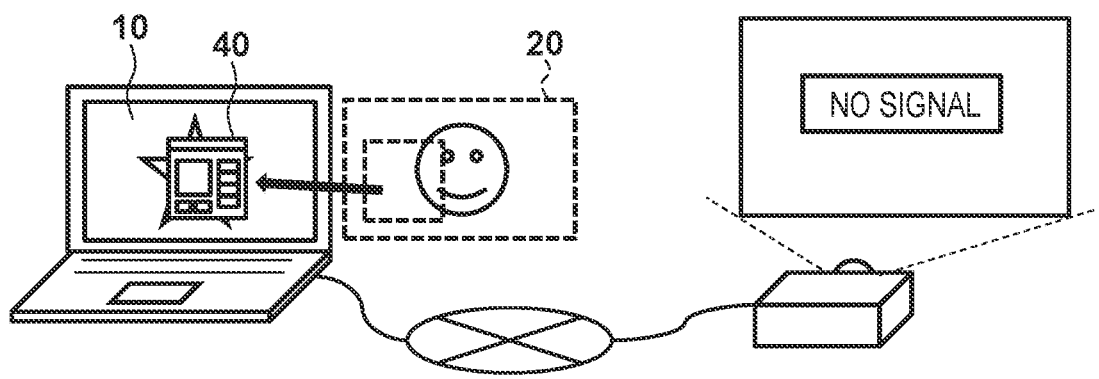

In step S704, the CPU 101 controls the display control unit 107 to move the display position of the projection control UI to the main display 10, and causes the process to proceed to step S705. In this case, as shown in FIG. 8C, the projection control UI 40 of the image transfer program positioned on the extended display is moved to the main display. It should be noted that, if the projection stop button 513 is pressed in the state shown in FIG. 5I, the processing in step S704 may also be executed upon making an inquiry to the user as to whether or not to move the projection control UI to the main display and confirming the intention of the user. In this case, the user may be prompted to perform a predetermined operation to forcibly move the projection control UI to the main display.

In step S705, the CPU 101 performs normal processing to stop projected display and terminates the process.

It should be noted that the term "normal processing to stop projection" refers to controlling the display control unit 107 to stop capturing data from the VRAM 103 and stop encoding, and controlling the communication unit 109 to stop transmission of the encoded image.

Display Processing of Projection Control UI Upon Stopping Transfer of Extended Display from PC 100b to Projector 200b in Response to Operation from Other PC 100a

The following describes, with reference to FIGS. 5 A to 5L and 7, the processing in which, in the state shown in FIG. 6C, the projector 200b stops projecting the extended display of the PC 100b in response to an operation being made on the projection control UI of the image transfer program of the PC 100a. The processing shown in FIG. 7 is implemented by the CPU 101 of the PC 100 executing the image transfer program.

As a result of the processing described in the first embodiment, the projection control UI of the image transfer program of the PC 100a is as shown in FIG. 5I. To stop the projection of an image by the projector 200b in the state shown in FIG. 5I, first, the tab 508 is selected in FIG. 5I. Then, the projection control UI changes to that shown in FIG. 5L.

By pressing the projection stop button 513 in the state shown in FIG. 5L, the image transfer program of the PC 100a transmits an instruction notification to the projector 200b via the communication unit 109 to stop the projection of the extended display image of the PC 100b.

Upon receiving this instruction notification, the CPU 201 of the projector 200b reads out information regarding the PC 100b from the session information managed by the RAM 202. Then, the CPU 201 transmits a request to stop the transmission of the extended display image to the IP address of the PC 100b included in the information regarding the PC 100b via the communication unit 209.

The image transfer program of the PC 100b receives the request to stop the projection of the extended display image via the communication unit 109. Then, the CPU 101 of the PC 100b starts the processing flow described in FIG. 7.

The following describes the processing that is performed if an extended display image transferred from the PC 100 ceases to be visible due to an operation made on the operation unit 208 of the projector 200. Operations made on the projector 200 that bring about a state in which the extended display image ceases to be visible include, for example, switching to a different input (e.g., HDMI) and blanking of the projection plane.

Upon receiving a notification indicating such a state from the operation unit 208, the CPU 201 of the projector 200 reads out information regarding the PC that was being projected, from the session information managed by the RAM 202. The CPU 201 then transmits a state notification regarding the fact that the transferred image is no longer being projected, to the IP address included in the information regarding the PC via the communication unit 209.

The image transfer program of the PC 100 receives this state notification via the communication unit 109. Subsequently, the CPU 101 of the PC 100 performs image transfer and starts the processing flow described in FIG. 7.

It should be noted that, if an extended display image ceases to be visible as a result of an operation made to the projector 200, the image transfer is not stopped and thus the processing of step S705 in FIG. 7 may not necessarily have to be performed. As a result, while the display position of the projection control UI is moved to the main display, the image transfer itself can be continued.

In the foregoing embodiment, to simplify the description, an example was described in which the image transfer program of the PC 100*a* is used to control projection. It should be noted, however, that the image transfer program of the PC 100*b* is also capable of performing the same control. The same applies if more PCs participate in a session.

Furthermore, control may be performed so that the projection control UI of the image transfer program is displayed at least on the main display when the extended display is projected. In other words, control may be performed to display the projection control UI of the image transfer program only on the main display (so that the projection control UI cannot be moved to the extended display), or control may also be performed to display the projection control UI on both the main display and the extended display. In this way, the projection control UI of the image transfer program remains visible at all times at least on the main display.

Furthermore, when projection of an extended display is stopped, control may be performed so that only the projection of the extended display image is stopped while the projection control UI is continuously displayed. In this way, the projection control UI of the image transfer program remains visible even when the image transfer processing is stopped.

As described above, according to the present embodiment, it is possible to avoid a situation in which the image transfer program cannot be operated even if an instruction to stop image transfer is issued while the projection control UI of the image transfer program is displayed on the extended display.

Moreover, it is also possible to avoid a situation in which the image transfer program cannot be operated if an instruction to stop projection of the extended display image is issued by the image transfer program of another PC while the projection control UI of the image transfer program is displayed on the extended display.

Moreover, it is also possible to avoid a situation in which the projection control UI cannot be operated if the projector is operated to make the image being transferred invisible while the projection control UI of the image transfer program is displayed on the extended display.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-042302, filed Mar. 8, 2018 which is hereby incorporated by reference herein in its entirety.

What is claimed is:

1. An information processing apparatus which displays an image on a display, comprising:
    a communication interface configured to communicate with a display apparatus; and
    a controller configured to transmit an extended display image to be displayed on the display apparatus to the display apparatus via the communication interface, the extended display image being different from the image displayed on the display,
    wherein, while a user interface capable of accepting operations related to the extended display image is displayed together with the extended display image on the display apparatus, the controller causes the user interface to be displayed on the display if an instruction to stop transmission of the extended display image is input via the user interface.

2. The apparatus according to claim 1,
    wherein the communication interface communicates with the display apparatus via a network, and
    the controller causes the user interface to be displayed on the display if an instruction to stop transmission of the extended display image is input from another information processing apparatus connected via the network.

3. The apparatus according to claim 1, wherein the controller causes the user interface to be displayed on the display if the extended display image ceases to be visible on the display apparatus as a result of an operation made on the display apparatus.

4. The apparatus according to claim 1, further comprising:
a unit configured to make an inquiry to a user as to whether or not to display the user interface on the display, if an instruction to stop transmission of the extended display image is input via the user interface.

5. The apparatus according to claim 1, wherein, while the user interface is displayed together with the extended display image on the display apparatus, the controller moves a display position of the user interface to the display if an instruction to stop transmission of the extended display image is input via the user interface.

6. The apparatus according to claim 5, further comprising: a second user interface configured to move the display position of the user interface to the display.

7. The apparatus according to claim 1, wherein, while the user interface is displayed on the display apparatus and not displayed on the display, the controller causes the user interface to be displayed on the display if an instruction to stop transmission of the extended display image is input via the user interface.

8. A method of controlling an information processing apparatus that includes a communication interface configured to communicate with a display apparatus via a network and displays an image on a display, the method comprising:
  transmitting an extended display image to be displayed on the display apparatus to the display apparatus via the communication interface, the extended display image being different from the image displayed on the display; and
  causing, while a user interface capable of accepting operations related to the extended display image is displayed together with the extended display image on the display apparatus, the user interface to be displayed on the display if an instruction to stop transmission of the extended display image is input via the user interface.

9. A non-transitory computer-readable storage medium storing a program for causing a computer to execute a method of controlling an information processing apparatus that includes a communication interface configured to communicate with a display apparatus via a network and displays an image on a display, the method comprising:
  transmitting an extended display image to be displayed on the display apparatus to the display apparatus via the communication interface, the extended display image being different from the image displayed on the display; and
  causing, while a user interface capable of accepting operations related to the extended display image is displayed together with the extended display image on the display apparatus, the user interface to be displayed on the display if an instruction to stop transmission of the extended display image is input via the user interface.

* * * * *